United States Patent [19]
Srinivasan

[11] Patent Number: 5,991,812
[45] Date of Patent: Nov. 23, 1999

[54] METHODS AND APPARATUS FOR FAIR QUEUING OVER A NETWORK

[75] Inventor: Sundaram Raj Srinivasan, San Jose, Calif.

[73] Assignee: ControlNet, Inc., Campbell, Calif.

[21] Appl. No.: 08/812,853

[22] Filed: Mar. 6, 1997

Related U.S. Application Data

[60] Provisional application No. 60/036,386, Jan. 24, 1997.

[51] Int. Cl.[6] ................................. H04J 3/14; G06F 9/00
[52] U.S. Cl. .......................... 709/232; 709/233; 709/234; 709/235; 370/229; 370/230; 370/235; 370/412
[58] Field of Search ......................... 395/200.62, 600.63, 395/200.64, 200.65; 370/229, 230, 235, 412; 709/232, 233, 234, 235

[56] References Cited

U.S. PATENT DOCUMENTS

| | | | |
|---|---|---|---|
| 5,519,701 | 5/1996 | Colmant et al. | 370/60.1 |
| 5,623,606 | 4/1997 | Yokoyama | 395/250 |
| 5,663,961 | 9/1997 | McRoberts et al. | 370/412 |
| 5,689,508 | 11/1997 | Lyles | 370/391 |

OTHER PUBLICATIONS

Surie et al., "Leap Forward Virtual Clocl: A new Fai Queueing Scheme with Guaranteed Delays and Throuput Fairness".
S. Suri, G. Varghese and C. Girish "Leap Forward Virtual Clock: A New Fair Queuing Scheme with Guaranteed Delays and Throughput Fairness," Dept. Of Computer Science, Washington University, St. Louis, MO, Jun. 24, 1996.
S. Keshav, "On the Efficient Implementation of Fair Queuing," Computer Science Div., UC Berkeley, Berkeley, CA, Sep., 1991.
S. Keshav, CH. 2: *Fair Queuing*, pp. 19–28, thesis, published as US Berkeley TR–654, Sep., 1991.
S. Floyd, *"Notes on CBQ and Guaranteed Service,"* Lawrence Berkeley Lab, Berkeley, CA, Jul. 12, 1995.

S. Keshav, *"Stop–and–Go Service Using Hierarchical Round Robin,"* At&T Bell Labs, Murray Hill, NJ, Oct. 1991.
S. Floyd and V. Jacobson *"Link–sharing and Resource Management Models for Packet Networks,"*: IEEE/ACM Transactions on Networking, vol. 3 No. 4, Network Research Group, Lawrence Berkeley Lab, Berkeley, CA, Aug., 1995.
V. Jacobson, "Flexible, efficient resource management for datagram networks," Lawrence Berkeley Lab, (joint work with S. Floyd), Sun Microsystems, Oct. 12, 1993.
S. Shenker, D. Clark and L. Zhang "A Scheduling Service Model and a Scheduling Architecture for an Integrated Services Packet Network," Palo Alto Research Center, Xerox Corporation, Aug. 1993.

(List continued on next page.)

*Primary Examiner*—Zarni Maung
*Assistant Examiner*—Saleh Najjar
*Attorney, Agent, or Firm*—Beyer & Weaver, LLP

[57] ABSTRACT

Disclosed is a queue selection method for performing data transfers. The method includes scaling a system bandwidth into a plurality of scaled bandwidth integers that extend to a maximum scaled system bandwidth integer. Providing a plurality of queues where each of the plurality of queues are associated with a scaled bandwidth integer, and a sum of the scaled bandwidth integers for each of the plurality of queues is less than or equal to the maximum scaled system bandwidth integer. The method further determines an allocated bandwidth integer from the scaled bandwidth integers for each of the plurality of queues that are enabled, and increments a system virtual time upon each cycle of a system clock while at least one of the plurality of queues is enabled. The method then selects one of the plurality of queues having a lowest queue virtual time, and outputs a packet from the selected one of the plurality of queues having the lowest queue virtual time. And, the queue virtual time of the selected one of the plurality of queues is incremented upon each cycle of the system clock while it is selected for transmission.

36 Claims, 6 Drawing Sheets

OTHER PUBLICATIONS

D. Clark, "Supporting Real–Time Applications in an Integrated Services Packet Network: Architecture and Mechanism," Massachusetts Inst. Of Tech., and S. Shenker and L. Zhang, Palo Alto Research Center, Xerox Corp., Aug. 1992.

S. Jamin, S. Shenker, L. Zhang and D. Clark "An Admission Control Algorithm for Predictive Real–Time Service," Third Int'l Workshop on Networking and OS support for Digital Audio/Video, San Diego, CA, Nov. 1992.

S. Shenker, D. Clark and L. Zhang "A Service Model for an Integrated Services Internet," Xerox PARC and MIT, Oct. 1993.

I. Wakeman, A. Ghosh, J. Crowcroft, UC London, and V. Jacobson and S. Floyd, Lawrence Berkeley Lab, *"Implementing Real Time Packet Forwarding Policies using Streams,"* London and Berkeley, CA, Nov. 7, 1994.

METHODS AND APPARATUS FOR FAIR QUEUING OVER A NETWORK

CROSS REFERENCE TO RELATED APPLICATIONS

This application claims the benefit of U.S. Provisional Patent Application having Ser. No. 60/036,386, filed on Jan. 24, 1997, entitled "Method and Apparatus for Router Queuing in a Network System." This application is hereby incorporated by reference.

BACKGROUND OF THE INVENTION

1. Field of the Invention

This invention relates generally to computer networks, and more particularly to routers, switches and the like for computer network systems.

2. Description of the Related Art

Computers are increasingly being coupled together into computer networks. In larger networks, devices known as "routers" or "switches" direct the flow of data packets between source and destination computers. Since the "bandwidth" of routers is limited, various "queuing" techniques have been developed to prioritize the forwarding of packets by computer network routers.

Fair queuing techniques in packet scheduling applications and devices have been extensively researched and are described in a number of publications. Generally, network switches are configured to receive a number of packets at their input ports (i.e., ports of entry), where each packet is usually one among a sequence of many packets that constitute a flow. The switch directs a flow to an output port (i.e., port of exit). Often, a flow has some requirements on network bandwidth; for example, if the flow constitutes video information (e.g., a movie) and the source of the information (e.g., a VCR) generates 1.5 Mb/s of data, the flow would require that the network guarantee 1.5 Mb/s of bandwidth. This means that any switches that the flow passes through on its way from the source to the destination will have to guarantee 1.5 Mb/s of bandwidth to the flow. Similarly, a flow carrying high quality audio information (e.g., a concert) may require 128 Kb/s of bandwidth from the network.

However, each output port typically has a fixed amount of bandwidth (e.g., 100 Mb/s) available, and each output port in a switch has a number of output queues. In operation, the switch will sort the flows bound for a particular output port into different output queues at the output port, such that each output queue services a flow with a particular bandwidth requirement. The switch must then ensure that each output queue is provided with sufficient access too the output port so that the requirements of the associated flows are met.

The result of not meeting the bandwidth requirements of a flow is increased delay, often beyond the tolerance of the flow. In such a situation, the source of the flow will be generating information faster than the network can transfer it to the destination. This means that over the course of time, some packets will be delayed excessively, and will have to be dropped (i.e., discarded), either because packets that have been delayed too much are rendered useless in real-time audio and video applications, or because the network has run out of resources to buffer packets. In either case, the result is reduced quality of reception; the reduction in quality may vary from a minor inconvenience to total incapacitation.

The technique employed by a switch to ensure that the requirements of a flow are met is called "fair queuing." A problem with existing queuing techniques is that the algorithms involve a very high number of arithmetical computations, and any simplifications made to the algorithms for ease of implementation in hardware and software tend to introduce significant inaccuracies, some of which are difficult to quantify. Good examples of prior art fair queuing techniques can be found in the Ph.D. thesis of A. K. Parekh entitled "A Generalized Processor Sharing Approach to Flow Control in Integrated Services Networks," Massachusetts Institute of Technology, LIDS-TH-2089, February 1992, which is incorporated herein by reference in its entirety. The Parekh thesis describes a theoretical generalized processor sharing (GPS) machine and the algorithms it uses to achieve fair queuing. The thesis also describes a more realistic scheme (PGPS) to implement the theoretical machine. In general, the PGPS computations are performed on a packet-by-packet basis to facilitate tracking the state of the theoretical machine to a very high degree of accuracy. This high level of accuracy enables tracking to within about one packet time.

While the apparatus and methods described by Parekh are notable advances to the art of network switching and routing, it is noted that his method requires a substantial number of arithmetical computations for efficient implementation in a high speed packet switch, using software or hardware techniques. Moreover, the PGPS technique of Parekh applies only to situations where packets are fully received before they can be forwarded. Unfortunately, the inability to forward packets before being fully received may render Parekh's method unsuitable for today's high-speed switches that necessarily require on-the-fly packet forwarding (also called cut-through forwarding).

In view of the foregoing, there is a need for fair queuing methods and apparatus that employ computationally efficient techniques to facilitate efficient hardware and software implementation.

SUMMARY OF THE INVENTION

Broadly speaking, the present invention fills these needs by providing fair packet queuing methods and apparatus that employ computationally efficient techniques to facilitate hardware and software implementation. It should be appreciated that the present invention can be implemented in numerous ways, including as a process, an apparatus, a system, a device, a method, or a computer readable medium. Several inventive embodiments of the present invention are described below.

In one embodiment, a queue selection method for performing data transfers is disclosed. The method includes scaling a system bandwidth into a plurality of scaled bandwidth integers that extend to a maximum scaled system bandwidth integer. Providing a plurality of queues where each of the plurality of queues is associated with a scaled bandwidth integer, and a sum of the scaled bandwidth integers for each of the plurality of queues is less than or equal to the maximum scaled system bandwidth integer. The method further determines an allocated bandwidth integer from the scaled bandwidth integers for each of the plurality of queues that are enabled, and increments a system virtual time upon each cycle of a system clock while at least one of the plurality of queues is enabled. The method then selects one of the plurality of queues having a lowest queue virtual time, and outputs a packet from the selected one of the plurality of queues having the lowest queue virtual time. And, the queue virtual time of the selected one of the plurality of queues is incremented upon each cycle of the system clock (i.e., while the packet is being transmitted). Preferably, the system virtual time and the queue virtual times are incremented by a pre-computed amount retrieved from a virtual time increment array.

In another embodiment, a queue selection method for data transfer over a network having a system bandwidth is disclosed. The queue selection method includes providing a plurality of queues to hold data to be transferred over the network, and each of the plurality of queues being associated with a bandwidth integer. Each of the plurality of queues has a bandwidth less than the system bandwidth, and the sum of the bandwidths for each of the plurality of queues is less than or equal to a maximum system bandwidth integer. The queue selection method further determines the plurality of queues that are enabled and determnines an allocated bandwidth integer from the bandwidth integers of each of the plurality of queues that are enabled. Then, a virtual time is incremented by a pre-computed amount while at least one of the plurality of queues is enabled. The queue selection method then selects one of the plurality of queues based on the virtual time, and outputs a packet from the selected one of the plurality of queues.

In yet a further embodiment, a queue selection apparatus is disclosed. The queue selection apparatus includes a plurality of queuing means for holding data to be transferred over the network. Each of the plurality of queuing means being associated with a bandwidth amount, and each of the plurality of queues having a bandwidth that is less than a system bandwidth. The sum of the bandwidth amounts for each of the plurality of queuing means being less than about a maximum system bandwidth integer. The queue selection apparatus further includes an allocated bandwidth computer means for calculating an allocated bandwidth for each of the plurality of queuing means that are enabled, and means for incrementing a virtual time by a pre-computed amount while at least one of the plurality of queuing means is enabled. The queue selection apparatus also includes a queue selection computer means for selecting one of the plurality of queuing means based on the virtual time, and an output means for outputting data from the selected one of the plurality of queuing means.

Advantageously, the embodiments of the present invention provide a fair queuing technique that uses few basic computations such as additions and subtractions that reduce computation overhead for hardware and software implementations. Moreover, the present invention is also suitable for dealing with cut-through forwarding. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

An invention is described for fair packet queuing that employs computationally efficient techniques to facilitate hardware and software implementations. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

It will be useful in the understanding of the present invention to begin with some definitions of terminology and to present an overview of how the modified system operates. The terminology used in this document is different from the terminology used in the aforementioned Ph.D. thesis of Parekh, which has been incorporated by reference. However, the Parekh document is useful in understanding the basic theory that is related to the present invention.

The Queuing System

Figure 1:
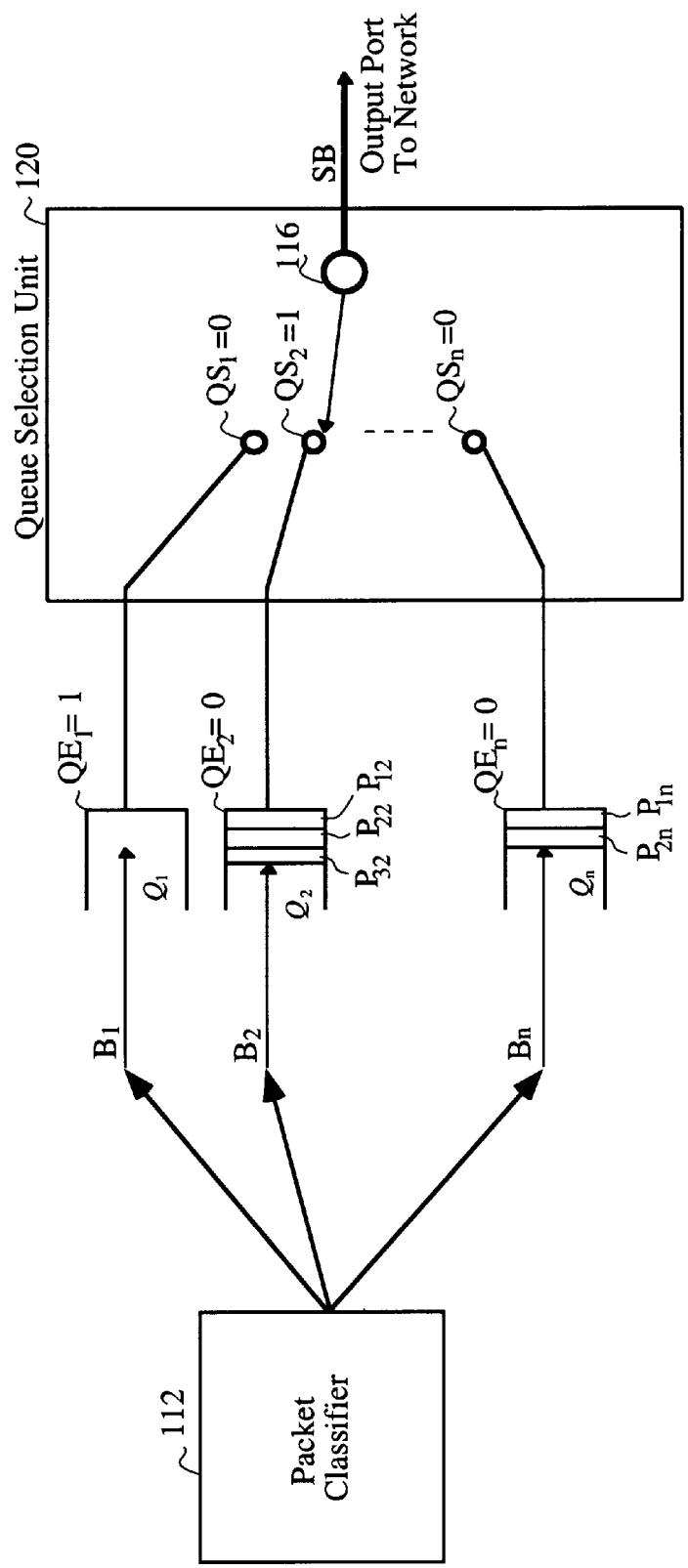
FIG. 1 illustrates a queuing mechanism as implemented in accordance with one embodiment of the present invention.

FIG. 1 illustrates a queuing mechanism as implemented in accordance with one embodiment of the present invention. In this embodiment, a packet classifier 112 is charged with receiving packets having different bandwidth ($B_i$) requirements and then passing them to queues having similar bandwidth assignments. As shown, packet classifier 112 passes packets having bandwidths $B_1$, $B_2$ and $B_n$ to a number of output queues shown as $Q_1$, $Q_2$, ... $Q_n$, respectively. The method used for determining the output queue for an incoming packet is not relevant to the queuing mechanism of this embodiment. The system generally includes of a number of input ports and one output port. As described above, it is of critical importance that the packets queued in the output queues $Q_1, Q_2, \ldots Q_n$ be forwarded to an output port 116 at rate that ensures that each output queue receives the assigned level of bandwidth.

In one embodiment, a queue is considered "empty" when there are no packets on the queue. Associated with each output queue $Q_1, Q_2, \ldots Q_n$, a queue empty ($QE_i$) variable indicates when one of the output queues are empty. By way of example, when a queue is empty, $QE_i$ takes the value "1," and when there is at least one packet in the queue, $QE_i$ takes the value of "0." As shown in FIG. 1, $Q_1$ does not currently contain any packets and is therefore shown set to $QE_1=1$. On the other hand, $Q_2, \ldots Q_n$ do contain packets and are therefore shown set to $QE_2=0, \ldots QE_n=0$.

In addition, for each output queue $Q_1, Q_2, \ldots Q_n$, a queue enable ($QEN_i$) variable is defined for indicating whether a particular queue is enabled (i.e., active) or disabled (i.e., inactive). By way of example, $QEN_i$ is set to "1" when a queue is enabled, and "0" when a queue is disabled. In general, a queue is enabled whenever there is at least one packet on the queue (that is, $QE_i=0$), and possibly for a short duration after the last packet on the queue has been transmitted. The short duration is discussed in greater detail below.

The switching system is defined to be in a "busy period" whenever at least one queue is enabled, and is in an "idle period" when no queues in the system are enabled. Thus, the system will go through a series of busy periods separated by idle periods. As mentioned earlier, queues $Q_2$ through $Q_n$ are shown containing packets which are defined as the "$i^{th}$" packet on the "$j^{th}$" queue (i.e., $P_{ij}$). By way of example, in $Q_2$, three packets are shown identified as $P_{32}, P_{22}$ and $P_{12}$, and in $Q_n$, two packets are shown identified as $P_{2n}$ and $P_{1n}$. Further, each packet $P_{ij}$ also has an associated length that will be denoted as $l_{ij}$. Accordingly, the packet at the head of queue $Q_2$ is packet $P_{12}$ that will preferably have a length $l_{12}$.

In one embodiment, a queue selection unit 120 at the output port 116 examines a set of system state variables to appropriately select one of the enabled queues for transmission. As will be described in greater detail below, the queue enable ($QEN_i$) variable is one of the system state variables that are constantly updated after each packet transmission. Therefore, as packets are transmitted, the system state variables of the switching system are updated. After a packet is transmitted, the queue selection unit 120 again examines the system state variables to ascertain which one of the enabled queues is to be selected for the next packet transmission. In this manner, if a queue becomes empty (i.e., $QE_i=1$) after a particular packet transmission, the excess bandwidth is advantageously distributed to the remaining enabled queues. Thus, for each packet transmission, the system state variables will preferably be different. Accordingly, queue selection unit 120 is responsible for efficiently selecting enabled queues after each packet transmission to ensure that each enabled queue receives fair access to output port 116.

Also shown associated with each output queue $Q_1, Q_2, \ldots Q_n$ is an integer $QS_1, QS_2, \ldots QS_n$ that is set to a value "1" when that particular queue is selected for transmission, and "0" when it is not selected for transmission. In the example shown, $QS_2$ is set to "1" because it is selected for transmission, and all other queues are set to "0."

The System State Variables

In one embodiment, the system state variables are broken down in terms of: a) time, and b) bandwidth. An exemplary time variable associated with queue selection unit 120 is a "system clock" (referred to herein as "TR") which is the "actual" current time. Thus, system clock TR is the real time. The units of system clock TR are clock "ticks." In this embodiment, a system clock tick corresponds to a fixed time interval. There are also state variables whose values are defined in "virtual time" units. Unlike the system clock TR, virtual time ticks are preferably not fixed time intervals. In operation, output port 116 preferably has associated with it a system virtual time (STV).

Further, each output queue $Q_i$ (i.e., output queues $Q_1, Q_2, \ldots Q_n$) has an associated queue virtual time ($TVQ_i$). In general, when each packet $P_{ij}$ queued in its respective output queue, the packet is time stamped with a packet virtual time ($TVP_{ij}$). A queue is considered enabled (i.e., active) when either $QE_i=0$ (that is, there is at least one packet on the queue), or the queue virtual time ($TVQ_i$) for that queue is greater than the system virtual time (STV). Accordingly, when these conditions are satisfied, $QEN_i$ will have the value 1, otherwise it will have the value 0.

With respect to bandwidth variables, the speed of the output port is defined in terms of system bandwidth (SB). As can be appreciated, the fair queuing methods of the present invention are directly correlated to the allocation of the system bandwidth (SB) to all of the output queues $Q_1, Q_2, \ldots Q_n$ that are enabled. As shown in FIG. 1, each queue will have an associated bandwidth $B_1, B_2, \ldots B_n$ that defines their desired minimum flow rate. The sum of the queue bandwidths (i.e., $\Sigma_{i \in [1 \ldots n]} B_i$) therefore must not exceed the system bandwidth (SB). This relationship is therefore expressed by the following inequality:

$$\Sigma_{i \in [1 \ldots n]} B_i \leq SB \qquad \text{(Equation 1)}$$

As described above, it is possible that not all queues will be active at a given time. Therefore, an allocated bandwidth (BA) is defined as the sum of the queue bandwidths for any currently enabled queues. This relationship is expressed in the following equation:

$$BA = \Sigma_{i \in [1 \ldots n]} B_i * QEN_i \qquad \text{(Equation 2)}$$

System Operation

It will be appreciated that the packet switching methods of the present invention are major implementation advancements over the theoretical methods proposed by Parekh. In addition, the methods of the present invention also allow for cut-through forwarding which is an important requirement in fast switching networks.

As mentioned earlier, the system may traverse (in time) through a series of busy periods separated by idle periods. Because the same principles of operation apply to all busy periods, the operation of the entire system will be described with reference to one busy period. In general, the operation states begin at an initial state (i.e., the state following an idle period), and then transition to a busy state. From the busy state, the system may then transition back to an idle state.

In one embodiment, the system bandwidth SB and the queue bandwidths $B_i$ can vary during system operation. However, these variables are changed by external entities that are not controlled by the queuing system. Accordingly, these variables are viewed as "configuration parameters," and are not part of the aforementioned system state variables that are updated by the system itself during the course of system operation.

When the queuing system is in an initial state at the end of an idle period, the exact value of the system clock TR is not relevant, but for the purposes of the following examples, it will be assumed that the system clock is set to zero (i.e., TR=0). Of course, when the system enters the initial state, the system goes to a "busy" state. In general, the system clock will always be running. By way of example, when TR=0, the system state variables will have the following values.

The system virtual time STV is set to "0," and for each $Q_i$, the queue virtual time $TVQ_i$ is set to "0." Queue empty $QE_i$ is set to "1" indicative of no packets being queued, queue enable $QEN_i$ is set to "0" indicative of inactivity, and queue selected $QS_i$ is set to "0" indicative of not being selected. And finally, the sum of queue bandwidths $B_i$ is preferably less than or equal to the system bandwidth SB as expressed in Equation 1 above.

Therefore, the system becomes enabled (i.e., active) when one or more packets are queued onto one or more output queues. That is, when at least one queue assumes a $QEN_i$ value of 1 (i.e., is enabled), the system becomes busy at a time TR=0. At the instant the system becomes busy, the system virtual time STV starts incrementing, and the queue selection unit 120 begins selecting from the active queues for transmission of packets. When a packet $P_{ij}$ is queued in a selected $Q_j$, the packet is assigned a time stamp $TVP_{ij}$ that is equal to a current value of the system virtual time STV. In other words, $TVP_{ij}$=STV at the instant packet $P_{ij}$ is queued.

As noted above, STV starts incrementing when the system enters a busy period. Therefore, when allocated bandwidth (BA) is constant for a real time interval of ΔTR, an increment in system virtual time STV is determined by the following equation.

$$\Delta STV = \Delta TR * (SB/BA) \quad \text{(Equation 3)}$$

Thus STV is a continuous, piece-wise linear function whose slope changes whenever the allocated bandwidth BA changes as fraction of the system bandwidth. Thus, virtual time increments are preferably computed at various events which include packet arrivals and the end of packet transmissions.

In one embodiment, the output queue $Q_j$ selected for transmission is the (non-empty $QE_j$=0) queue that has the least value for $TVQ_j$ among all non-empty queues. In case of ties, the queue with the minimum index "j" is selected. After queue $Q_j$ is selected, the time stamp $TVP_{ij}$ of the first packet is examined. If the queue virtual time $TVQ_j$ is less than $TVP_{ij}$, it is set equal to $TVP_{ij}$. Otherwise, it is not changed.

Therefore, the queue virtual time $TVQ_j$ of the selected queue increments each time its is selected for transmission. Preferably, the increment by which the queue virtual time $TVQ_j$ advances is based on the length of the packet $P_{ij}$ being transmitted and the bandwidth $B_j$ of the selected queue. The incremental value may be calculated using the following equation:

$$\Delta TVQ_j = l_{ij}/B_j \quad \text{(Equation 4)}$$

It is important to note that the length $l_{ij}$ of the packet being transmitted need not be known until after the packet transmission has been completed. Advantageously, this feature enables the switching system to forward packets on-the-fly.

Assuming that the last packet has just been transmitted from the selected $Q_j$, and the queue virtual time $TVQ_j$ has just been incremented in the manner indicated in (Equation 4), and the system virtual time STV has been incremented as indicated in (Equation 3). In this embodiment, all queues having a queue virtual time $TVQ_j$ that is greater than the system virtual time STV are considered to be enabled. That is, these queues are still enabled even when no packets remain in the queue. As a result, only when the system virtual time STV has advanced beyond all queue virtual times $TVQ_j$ having no queued packets will the queuing system enter the idle state. When the system enters the idle state, the system state variables will revert to their initial values. As described above, the queuing system will preferably assume an initialized state when the system virtual time STV is set to "0," and for each $Q_i$, the queue virtual time TVQi is set to "0." Queue empty $QE_i$ is set to "1" indicative of no packets being queued, queue enable $QEN_i$ is set to "0" indicative of inactivity, and queue selected $QS_i$ is set to "0" indicative of no queues being selected. And finally, the sum of queue bandwidths $B_i$ is preferably less than or equal to the system bandwidth SB as expressed in Equation 1 above.

In an alternative embodiment, a method is disclosed which does not require knowledge of a packet's length in order to compute a queue virtual time $TVQ_j$. In this embodiment, the system bandwidth (SB) is divided (i.e., scaled) into fixed units "u" of bandwidth. If the unit of allocation is u%, the system bandwidth SB will have a value of 100/u. Thus, when u=1%, SB will be 100 (i.e., SB=100/1=100). Accordingly, if the system bandwidth SB is 100 megabits per second (Mb/s), and u=1%, a particular queue may have a bandwidth $B_i$ that is an integral multiple of "1 Mb/s" between about 1 Mb/s and about 100 Mb/s, subject to the constraint expressed in (Equation 1). That is, the sum of the enabled queues must not exceed the total system bandwidth which is 100 Mb/s in this example. Therefore, each queue $Q_i$ may have an integral value bandwidth $B_i$ in a range between about 1 and 100.

As another example, if the unit of allocation u is changed to 0.5%, the system bandwidth SB will have a value of 200, and for each queue $Q_i$, $B_i$ will have an integral value in the range 1 through 200. Of course, an allocation of 0% is a special case, since a queue with 0% allocation will never become enabled.

For comparison purposes, Equation 3 and Equation 4 illustrate methods by which the system virtual time STV is incremented, and the queue virtual time $TVQ_i$ is incremented based on the length of the transmitted packet. In this embodiment, it is not necessary to take into account the length of the packets being transmitted. As can be appreciated, eliminating the multiplication and division operations of (Equations 3 and 4) is advantageous because multiplication operations tend to increase hardware requirements (e.g., increase number of transistors in a semiconductor chip).

In one embodiment, the system bandwidth SB is set to the above-defined value of 100/u, and the system virtual time STV and the queue virtual times $TVQ_j$ are incremented by pre-computed values that are rapidly accessed after each "tick" of the system clock TR. That is, the pre-computed values define the amount by which the system virtual time STV and the queue virtual times $TVQ_j$ are incremented.

The pre-computed values are preferably stored in a "virtual time increment (VTI) array" having a length of 100/u (which is equal to the total system bandwidth SB). In this manner, the $i^{th}$ element of the VTI array is denoted by $VTI_i$ (or sometimes by VTI[i]). The VTI array is computed as follows:

$$VTI_i = C*(100/(i*u)), \text{ where } i \in [1 \ldots 100/u] \quad \text{(Equation 5)}$$

Note that the lowest index is 1 and the highest index is 100/u, which is the scaled value of the system bandwidth SB. C is a constant used to scale virtual time increments in order to minimize the impact of rounding errors. It should be understood that virtual times are preferably only used in performing comparisons that aid in the selection of a queue for transmission. The selection of a queue for transmission will be described in greater detail with reference to FIG. 7 below. Accordingly, the absolute magnitude of a virtual time does not affect the algorithm used. In addition, relative magnitudes are not affected because the constant C used for scaling applies to all virtual times.

As such, it should be noted from Equation 5 that $VTI_i$ only depends on u and C. By way of example, if u=1% and C=512, the VTI array will only have 100 elements. The following table shows exemplary pre-computed virtual time increment (VTI) values for the VTI array.

| Pre-Computed Virtual Time Increments | |
|---|---|
| $VTI_1 =$ | 51200 |
| $VTI_2 =$ | 25600 |
| $VTI_3 =$ | 17067 |
| $VTI_4 =$ | 12800 |
| $VTI_5 =$ | 10240 |
| $VTI_6 =$ | 8533 |
| $VTI_7 =$ | 7314 |
| $VTI_8 =$ | 6400 |
| $VTI_9 =$ | 5689 |
| ... | ... |
| $VTI_{20} =$ | 2560 |
| ... | ... |
| $VTI_{30} =$ | 1707 |
| ... | ... |
| $VTI_{40} =$ | 1280 |
| ... | ... |
| $VTI_{90} =$ | 569 |
| ... | ... |
| $VTI_{99} =$ | 517 |
| $VTI_{100} =$ | 512 |

Preferably, the system virtual time STV is updated on every tick of the system clock TR as defined in Equation 3 above. In this example, when $\Delta TR=1$ is input into Equation 3, $\Delta STV$ is set equal to SB/BA. As described above, BA is the sum of the bandwidths for the enabled queues. By way of example, if in FIG. 1, $Q_1$ has a bandwidth $B_1=20$, $Q_2$ has a bandwidth $B_2=30$ and $Q_n$ has a bandwidth $B_n=40$, then BA would be 90 (i.e., 20+30+40=90). Because BA is 90 (an integer in the range of 1 through SB), $\Delta STV$ is the $90^{th}$ element of VTI. Therefore, on every "tick" of the system clock TR, the system virtual time STV is incremented by an amount equal to the $90^{th}$ element of VTI (that is, VTI[BA]). In this example, the $90^{th}$ element of VTI is equal to 569.

In addition, the queue virtual time $TVQ_j$ will be updated on every "tick" of the system clock while $QS_j$ has the value 1 (that is, while $Q_j$ is selected for transmission), according to equation (4). The amount of the increment is derived as follows. The length $I_{ij}$ of the packet is expressed as follows:

$$l_{ij}=k*SB \quad \text{(Equation 6)}$$

In Equation 6, "k" is the number of "ticks" of the system clock TR takes to transmit a packet, and SB is the system bandwidth. By substituting Equation 6 into Equation 4, the following equation is derived:

$$\Delta TVQ_j=k*SB/B_j \quad \text{(Equation 7)}$$

Thus, the increment for each tick of the system clock is $SB/B_j$, which is the $B_j^{th}$ element of VTI. By way of example, if in FIG. 1, $Q_1$ has a bandwidth of $B_1=20$, then the increment for each tick of the system clock will be $VTI_{20}=2560$. As an example, it takes three ticks to transmit a packet, the virtual time increments made to the queue virtual time $\Delta TVQ_1=3*2560=7680$. Thus, on every tick of the system clock, while $QS_j$ has the value 1, the queue virtual time $TVQ_j$ will be incremented by an amount equal to the $B_j^{th}$ element of VTI (that is, VTI[$B_j$]).

By applying the above described techniques, a computationally efficient fair queuing system is implemented. As such, queue selection unit 120 of FIG. 1 is able to select an output queue $Q_1, Q_2, \ldots Q_n$ while reducing the number of computations that unfortunately increase the demands of hardware (i.e., increases transistor count) and software queue selection units. Furthermore, once a queue is selected for transmission, the system state variables are updated before the next queue is selected for transmission.

The initial state at the end of a system idle period will now be described. The system bandwidth SB and queue bandwidths $B_i$ are scaled to values in the range of 1 through 100/u, where u is the unit of bandwidth allocation. The VTI array, of length 100/u, has the pre-computed virtual time increments. The virtual time state variables STV, and TVQi are set to 0. For each $Q_i$, queue empty $QE_i=1$. The derived variables BA, $QS_i$, and $QEN_i$ are all set to zero.

When a packet $P_{ij}$ is queued in a particular queue $Q_j$, the packet is given a time stamp equal to STV. In other words, the packet virtual time $TVP_{ij}$ is set to the current value of STV. At the same time, queue empty $QE_j$ is set to 0, since $Q_j$ is no longer empty. If there are no more packets on $Q_j$ after a packet is transmitted out from the queue, $QE_j$ is set to 1. However, if packets remain on $Q_j$, $QE_j$ will remain set to 0.

Figure 2:
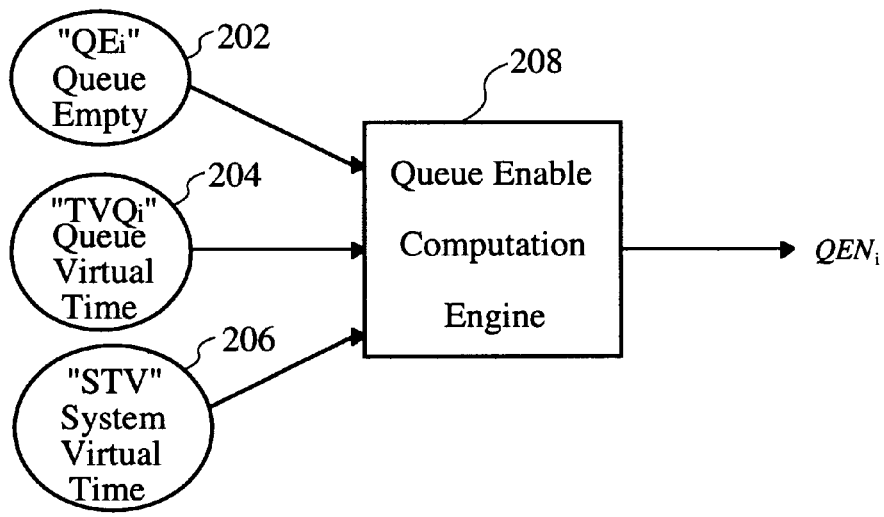
FIG. 2 illustrates a queue enable computation engine that is configured to compute $QEN_i$ in accordance with one embodiment of the present invention.

FIG. 2 illustrates a queue enable computation engine 208 that is configured to compute $QEN_i$ in accordance with one embodiment of the present invention. Preferably, queue enable computation engine 208 receives queue empty $QE_i$ 202 signals, queue virtual times $TVQ_i$ 204 signals, and a system virtual time STV 206 signal. When $QE_i$ 202 is equal to zero "0" (i.e., the queue is not empty), or $TVQ_i$ 204 is greater than STV 206, queue enable $QEN_i$ will be set to 1. On the other hand, if neither $QE_i$ 202 is equal to zero "0," nor is TVQi 204 greater than STV 206, queue enable $QEN_i$ will be set to zero "0." As described above, when queue enable $QEN_i$ is set to zero "0," that queue is said to be disabled.

Figure 3:
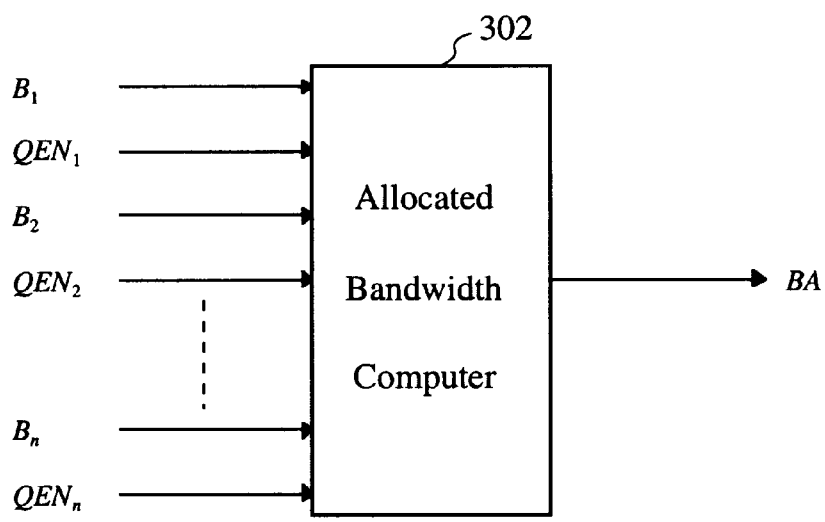
FIG. 3 illustrates an allocated bandwidth computer that is configured to compute allocated bandwidth BA in accordance with one embodiment of the present invention.

FIG. 3 illustrates an allocated bandwidth computer 302 that is configured to compute allocated bandwidth BA in accordance with one embodiment of the present invention. In this embodiment, a sum of each queue's bandwidths "$B_i$" for which $QEN_i$ is 1 is calculated. In other words, the bandwidths of each of the enabled queues are added together to generate an allocated bandwidth BA. In the example given above, when $Q_1$ has a bandwidth $B_1=20$, $Q_2$ has a bandwidth $B_2=30$ and $Q_n$ has a bandwidth $B_n=40$, the allocated bandwidth BA will be 90 (i.e., 20+30+40=90).

Figure 4:
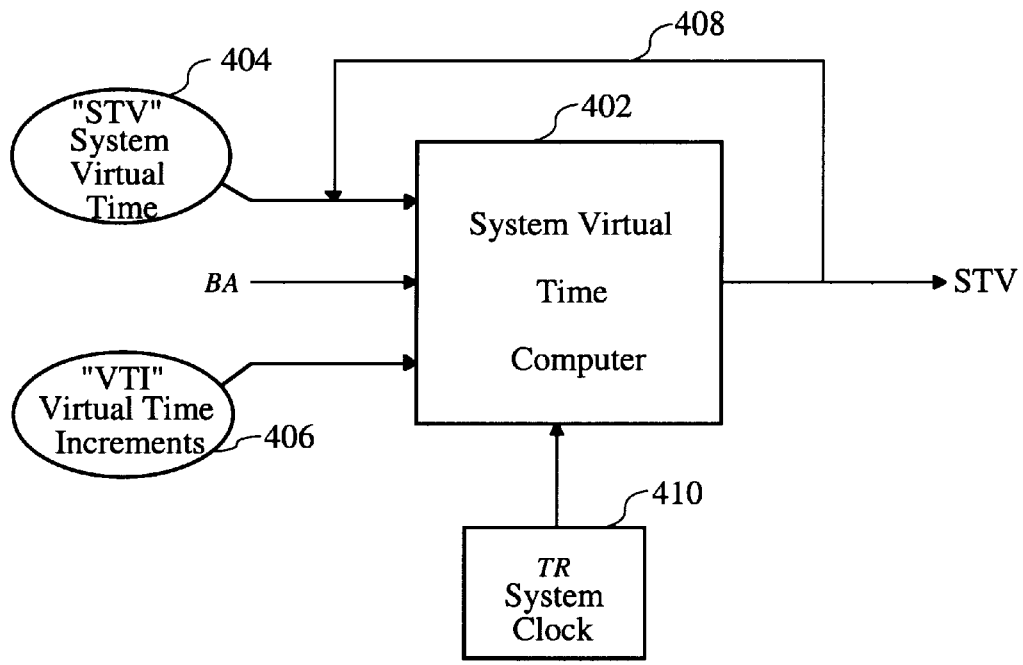
FIG. 4 illustrates a system virtual time (STV) computer that is configured to compute an incremented value of STV in accordance with one embodiment of the present invention.

FIG. 4 illustrates a system virtual time (STV) computer 402 that is configured to compute an incremented value of STV after each system clock TR 410 tick in accordance with one embodiment of the present invention. In general, after every tick of the system clock TR 410, the allocated bandwidth BA (that is output from the allocated bandwidth computer 302 of FIG. 3) is input into the system virtual time computer 402. At the same time, after every tick of the system clock TR 410, the current value of STV 404 is incremented by a $BA^{th}$ element of virtual time increments VTI 406. Once incremented, the new incremented value of STV will become a current value of STV 404 as illustrated by a feedback line 408.

Figure 5:
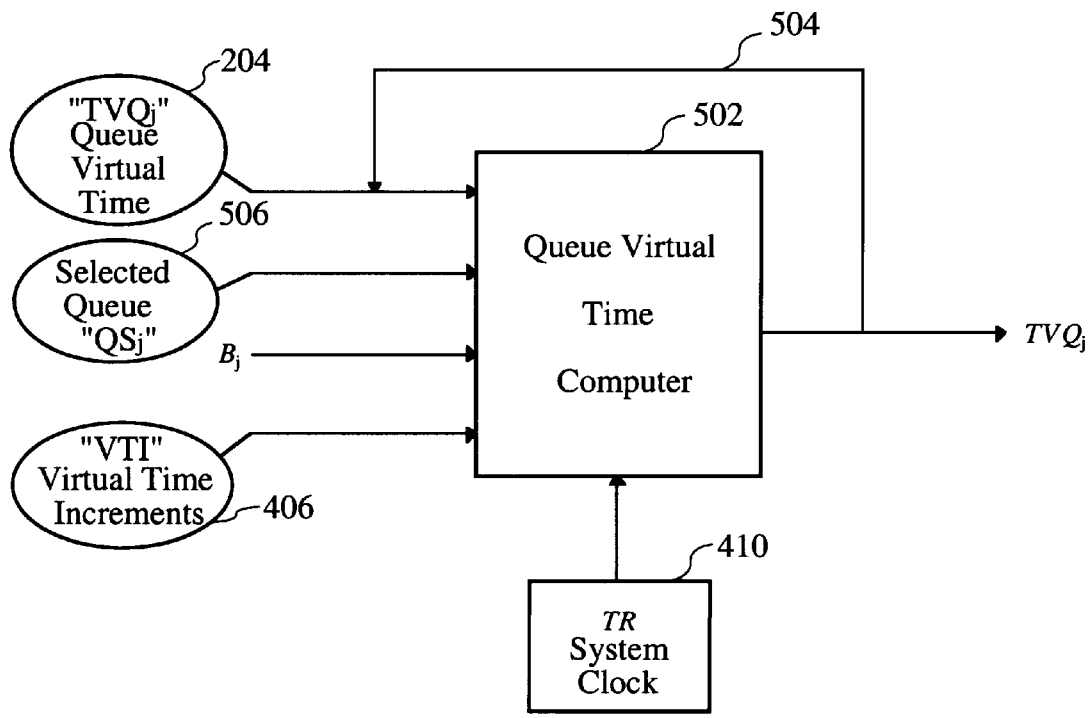
FIG. 5 illustrates a queue virtual time ($TVQ_j$) computer that is configured to compute an incremented value of $TVQ_j$ in accordance with one embodiment of the present invention.

FIG. 5 illustrates a queue virtual time ($TVQ_j$) computer 502 that is preferably suited to compute an incremented value of $TVQ_j$ in accordance with one embodiment of the present invention. By way of example, while $QS_j$ is set equal to "1" (i.e., the queue is currently selected for transmission), the current TVQj 204 is incremented by a $B_j^{th}$ element of VTI (VTI[$B_j$]) 406 for every "tick" of the system clock TR 410. Accordingly, the $B_j^{th}$ element establishes an incremental amount per-tick; however, the actual increment for $TVQ_j$ 204 is actually a summation of the established incremental amount. That is, one incremental amount is added for each tick required to transmit a packet.

Queue virtual time ($TVQ_j$) computer 502 is also shown receiving a selected queue $QS_j$ 506 signal and the queue bandwidths $B_j$ for each of the active queues. In sum, queue virtual time $TVQ_j$ 204 for the selected queue is incremented, and then updated by a feedback line 504 that replaces the previous $TVQ_j$ 204 with an incremented $TVQ_j$ 204.

Figure 6:
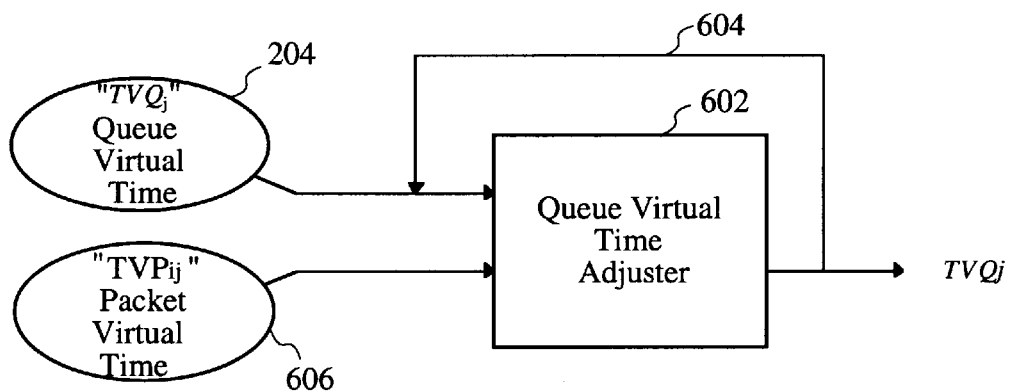
FIG. 6 illustrates a queue virtual time adjuster for updating $TVQ_j$ based on the packet virtual time $TVP_{ij}$ in accordance with one embodiment of the present invention.

FIG. 6 illustrates a queue virtual time adjuster 602 for updating $TVQ_j$ based on the packet virtual time $TVP_{ij}$ in accordance with one embodiment of the present invention. By way of example, when a queue is selected for transmission, the packet virtual time $TVP_{ij}$ is compared to the queue virtual time $TVQ_j$. If the $TVP_{ij}$ assigned to the packet when queued is greater than the queue virtual time $TVQ_j$, then the queue virtual time $TVQ_j$ is set equal to the packet virtual time $TVP_{ij}$. However, if the queue virtual time $TVQ_j$ is greater than or equal to the packet virtual time $TVP_{ij}$, then the queue virtual time $TVQ_j$ is not adjusted.

This adjustment is necessary to avoid selecting a queue merely because it has been inactive for a long period of time. As can be appreciated, this is advantageous to prevent giving a queue unfair selection merely because it has been inactive for a long period of time.

Figure 7:
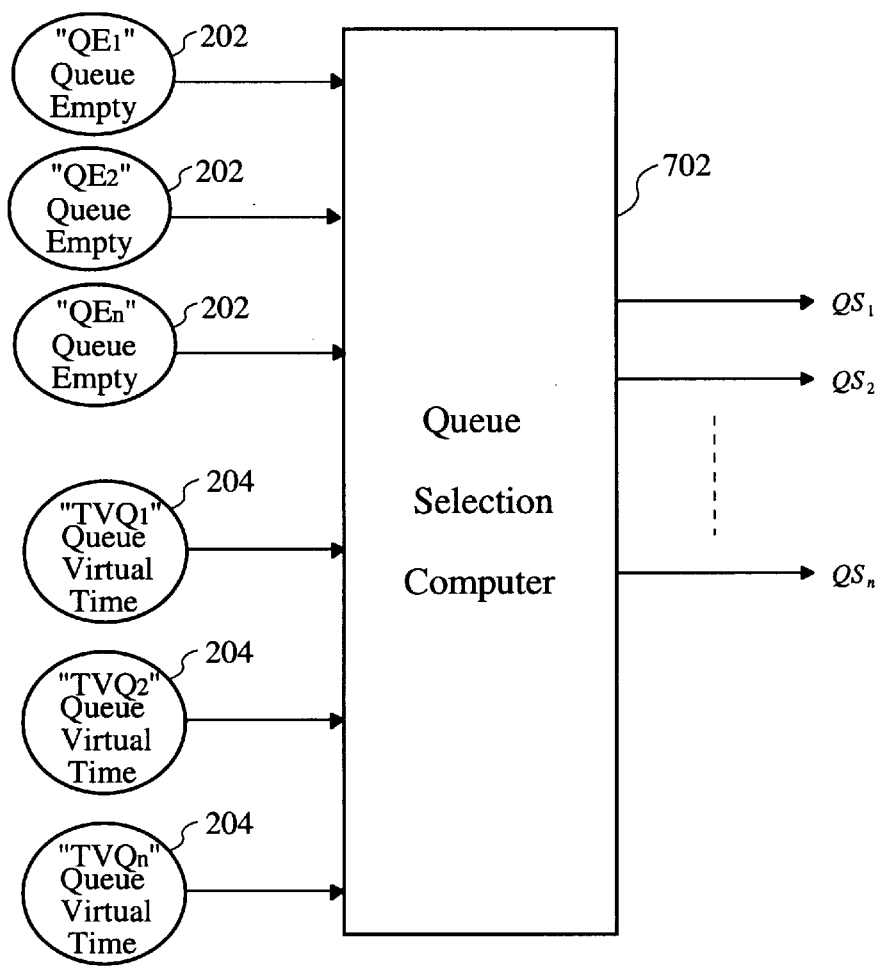
FIG. 7 illustrates a queue selection computer implemented to analyze the system state variables to fairly select an output queue for transmission in accordance with one embodiment of the present invention.

FIG. 7 illustrates a queue selection computer 702 implemented to analyze the system state variables to fairly select an output queue for transmission in accordance with one embodiment of the present invention. As shown, each of the queue empty $QE_i$ 202 data signals as well as each of the queue virtual time $TVQ_i$ 204 signals are input into the queue selection computer 702. The queue selection computer then identifies each of the non-empty queues (i.e., $QE_i$=0). Once the non-empty queues are identified, the queue virtual time $TVQ_i$ 204 for the non-empty $QE_i$ 202 are compared to determine which $TVQ_i$ 204 has the lowest value (i.e., which has been waiting longer). Once the queue having the lowest queue virtual time $TVQ_i$ is identified, the queue select $QS_i$ associated with the lowest value queue virtual time $TVQ_i$ is set to 1 (ie., $QS_i$=1). In a further embodiment, if there is more than one queue virtual time $TVQ_i$ having a lowest queue virtual time value (i.e., a tie for the lowest $TVQ_i$), then the $TVQ_i$ having a minimum value of "i" is selected. Once a $QS_i$ is selected, all other $QS_i$ are set to zero "0."

Figure 8:
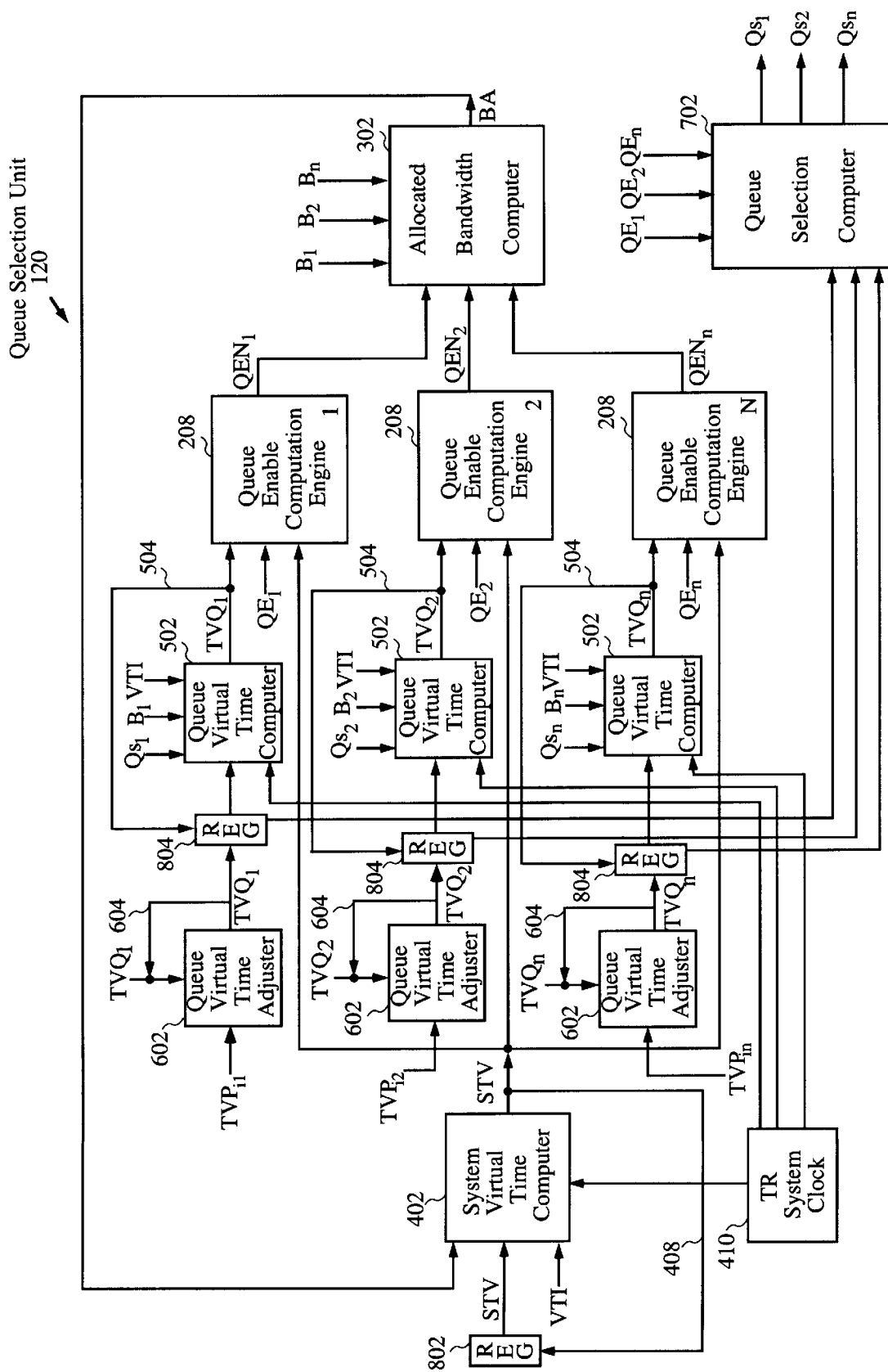
FIG. 8 is an overview functional architecture of a queue selection unit in accordance with one embodiment of the present invention.

FIG. 8 is an overview functional architecture of a queue selection unit 120 in accordance with one embodiment of the present invention. Although only the processing flow of exemplary output queues $Q_1, Q_2, \ldots Q_n$ are shown, it should be apparent that the processing techniques described above are applicable to any number of output queues.

As described above, the system bandwidth SB and queue bandwidths $B_{1, 2, and n}$ are scaled to values in the range of 1 through 100/u, where u is a unit of bandwidth allocation. To increment system virtual time STV and the queue virtual times $TVQ_j$, both the system virtual time computer 402 and the queue virtual time computer 502 are configured to receive data from the VTI array. As described above, the values selected from the VTI array are determined based on the allocated bandwidth "BA" for the system virtual time computer 402, and the queue bandwidths "$B_i$" for each queue virtual time computer 502.

As illustrated, the system virtual time computer 402 is preferably configured to receive the allocated bandwidth "BA" from the allocated bandwidth computer 302, and each queue virtual time computer 502 is configured to receive queue bandwidth "$B_i$" information for its associated queue. The virtual time increment is preferably performed after each system clock TR 410 tick. Accordingly, the system clock TR 410 is shown coupled to the system virtual time computer 402 and each of the queue virtual time computers 502. Once the system virtual time STV is incremented, the incremented value is updated via the feedback line 408 and each of the queue virtual times TVQj are updated via the feedback lines 504. In this manner, the updated values are stored in registers 802 and 804 respectively.

Initially, the queue virtual times $TVQ_j$ are input into the queue virtual time adjusters 602, where the queue virtual times $TVQ_j$ are compared to the $TVP_{ij}$ (i.e., packet time stamps) of the incoming packets. If the $TVP_{ij}$ is greater than the queue virtual times $TVQ_j$, the queue virtual times $TVQ_j$ are set equal to the later time of the $TVP_{ij}$. Once this adjustment is made (if necessary), the new queue virtual times $TVQ_j$ are passed to the registers 804 and fed back as an input to the queue virtual time adjusters 602 via feedback lines 604.

To compute the aforementioned allocated bandwidth BA, allocated bandwidth computer 302 needs to determine which queues are actually enabled. To do this, the queue enable computation engines 208 feed the $QEN_i$ signals into allocated bandwidth computer 302. Once the $QEN_i$ information is received, the scaled bandwidth data $B_1$, $B_2$ and $B_n$ are received by the allocated bandwidth computer 302. These values are used to compute BA which is passed to the system virtual time computer 402. As described above, the system virtual time computer 402 uses the BA value received from the allocated bandwidth computer 302 to pick-out the pre-computed system virtual time STV increment from the VTI array. Further, the queue enable computation engines 208 are configured to receive the updated system virtual time STV, the queue virtual time $TVQ_i$ data from the queue virtual time computers 502 and the queue empty $QE_i$ signals for each queue.

Accordingly, when the queue empties $QE_i$ are equal to zero "0" (i.e., the queues are not empty), or the queue virtual times $TVQ_i$ are greater than the system virtual times STV, the queue enables $QEN_i$ will be set to 1. On the other hand, if neither of the queue empties $QE_i$ are equal to zero "0," nor are the queue virtual times $TVQ_i$ greater than the system virtual time STV, the queue enables $QEN_i$ will be set to zero "0."

When a queue is selected for transmission, $QS_i$=1 is input into the queue virtual time computer 502 which increments the queue virtual time $TVQ_i$ by a pre-calculated increment selected from the VTI array" for every system clock tick, while $Qs_i$=1. As described above, this new value is then stored in register 804 which is communicated to the queue selection computer 702. Once the queue selection computer 702 holds the current values for all queue virtual times $TVQ_i$ and information on whether each queue is enabled, the queue selection computer 702 will select the queue having the lowest queue virtual time $TVQ_i$ as described with reference to FIG. 7.

The present invention may be implemented using any type of integrated circuit logic or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from IEEE of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 9:
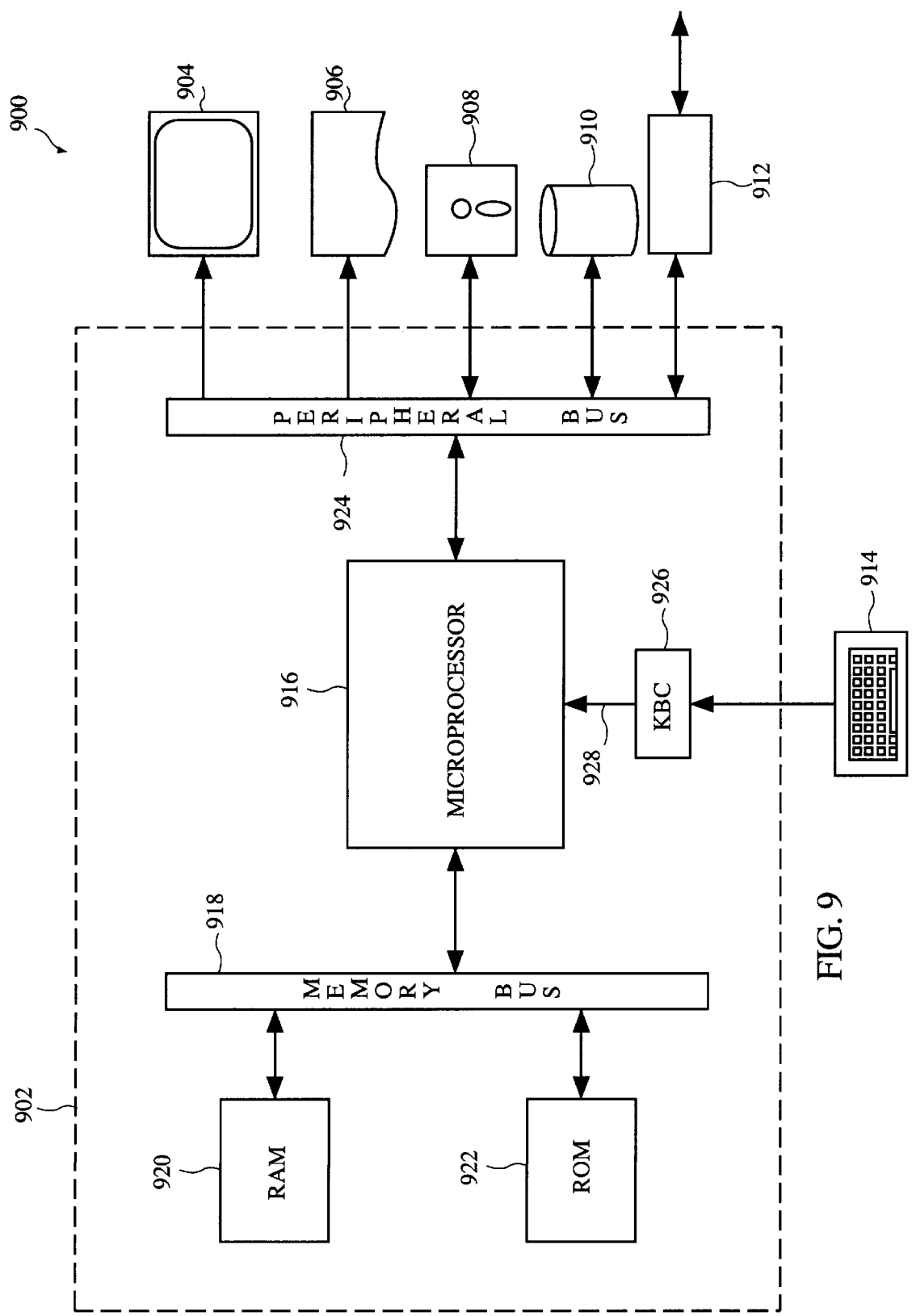
FIG. 9 is a block diagram of an exemplary computer system for carrying out the processing according to the invention.

FIG. 9 is a block diagram of an exemplary computer system 900 for carrying out the processing according to the invention. The computer system 900 includes a digital computer 902, a display screen (or monitor) 904, a printer 906, a floppy disk drive 908, a hard disk drive 910, a network interface 912, and a keyboard 914. The digital computer 902 includes a microprocessor 916, a memory bus 918, random access memory (RAM) 920, read only memory (ROM) 922, a peripheral bus 924, and a keyboard controller 926. The digital computer 900 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 916 is a general purpose digital processor which controls the operation of the computer system 900. The microprocessor 916 can be a single-chip processor or can be implemented with multiple components. Using instructions retrieved from memory, the microprocessor 916 controls the reception and manipulation of input data and the output and display of data on output devices. According to the invention, a particular function of microprocessor 916 is to assist in the queuing tasks.

The memory bus 918 is used by the microprocessor 916 to access the RAM 920 and the ROM 922. The RAM 920 is used by the microprocessor 916 as a general storage area and as scratch-pad memory, and can also be used to store input data and processed data. The ROM 922 can be used to store instructions or program code followed by the microprocessor 916 as well as other data.

The peripheral bus 924 is used to access the input, output, and storage devices used by the digital computer 902. In the described embodiment, these devices include the display screen 904, the printer device 906, the floppy disk drive 908, the hard disk drive 910, and the network interface 912. The keyboard controller 926 is used to receive input from keyboard 914 and send decoded symbols for each pressed key to microprocessor 916 over bus 928.

The display screen 904 is an output device that displays images of data provided by the microprocessor 916 via the peripheral bus 924 or provided by other components in the computer system 900. The printer device 906 when operating as a printer provides an image on a sheet of paper or a similar surface. Other output devices such as a plotter, typesetter, etc. can be used in place of, or in addition to, the printer device 906.

The floppy disk drive 908 and the hard disk drive 910 can be used to store various types of data. The floppy disk drive 908 facilitates transporting such data to other computer systems, and hard disk drive 910 permits fast access to large amounts of stored data.

The microprocessor 916 together with an operating system operate to execute computer code and produce and use data. The computer code and data may reside on the RAM 920, the ROM 922, or the hard disk drive 910. The computer code and data could also reside on a removable program medium and loaded or installed onto the computer system 900 when needed. Removable program mediums include, for example, CD-ROM, PC-CARD, floppy disk and magnetic tape.

The network interface 912 is used to send and receive data over a network connected to other computer systems. An interface card or similar device and appropriate software implemented by the microprocessor 916 can be used to connect the computer system 900 to an existing network and transfer data according to standard protocols.

The keyboard 914 is used by a user to input commands and other instructions to the computer system 900. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. In addition, it should be understood that the various processing functions described above may be implemented both in silicon as hardware integrated circuits, or as software code that may be stored and retrieved from any suitable storage medium. Accordingly, the present embodiments are to be considered as illustrative and not restrictive, and the invention is not to be limited to the details given herein, but may be modified within the scope and equivalents of the appended claims.

What is claimed is:

1. A queue selection method for data transfer, comprising:
   scaling a system bandwidth into a plurality of scaled bandwidth integers extending to a maximum scaled system bandwidth integer;
   providing a plurality of queues, each of the plurality of queues being associated with a scaled bandwidth integer such that a sum of the scaled bandwidth integers for each of the plurality of queues is less than or equal to the maximum scaled system bandwidth integer;
   determining an allocated bandwidth integer from the scaled bandwidth integers of the plurality of queues that are enabled;
   precomputing a set of varying time increment amounts;
   incrementing a system virtual time upon each cycle of a system clock while at least one of the plurality of queues is enabled, said incrementing using one of said precomputed time amounts that is associated with the allocated bandwidth integer;
   selecting one of the plurality of queues having a lowest queue virtual time making use of the system virtual time;

outputting a packet of any length from the selected one of the plurality of queues having the lowest queue virtual time; and incrementing the queue virtual time of the selected one of the plurality of queues upon each cycle of the system clock whereby said selected queue is selected in a computationally efficient manner.

2. A queue selection method for data transfer as recited in claim 1, wherein the pre-computed amount is retrieved from a virtual time increment array.

3. A queue selection method for data transfer as recited in claim 2, wherein the determined allocated bandwidth integer is mapped to a specific pre-computed amount in the virtual time increment array.

4. A queue selection method for data transfer as recited in claim 1,
   wherein said incrementing the queue virtual time includes incrementing by one of said pre-computed time amounts associated with the scaled bandwidth integer for the selected queue, and
   wherein said selecting one of the plurality of queues includes comparing queue virtual times of said queues.

5. A queue selection method for data transfer as recited in claim 4, wherein the pre-computed amount is retrieved from a virtual time increment array.

6. A queue selection method for data transfer as recited in claim 5, wherein the scaled bandwidth integer of the selected one of the plurality of queues is mapped to a specific pre-computed amount in the virtual time increment array.

7. A queue selection method for data transfer as recited in claim 1, further comprising:
   comparing a packet virtual time of a packet queued in one of the plurality of queues with the queue virtual time associated with the one of the plurality of queues; and
   updating the queue virtual time to the packet virtual time when the packet virtual time is greater than the queue virtual time.

8. A queue selection method for data transfer as recited in claim 7, wherein the packet virtual time is assigned the system virtual time when the packet is queued.

9. A queue selection method for data transfer of packets of any length over a network having a system bandwidth, comprising:
   providing a plurality of queues to hold data to be transferred over the network, each of the plurality of queues being associated with a bandwidth integer, each of the plurality of queues having a bandwidth less than the system bandwidth, and the sum of the bandwidths for each of the plurality of queues is less than or equal to a maximum system bandwidth integer;
   determining the plurality of queues that are enabled;
   determining an allocated bandwidth integer from the bandwidth integers of the plurality of queues that are enabled;
   precomputing a set of varying time increment amounts;
   incrementing a virtual time by one of said pre-computed amounts while at least one of the plurality of queues is enabled;
   selecting one of the plurality of queues based on the virtual time; and
   outputting a packet of any length from the selected one of the plurality of queues, whereby said selected queue is selected in a computationally efficient manner.

10. A queue selection method for data transfer over a network having a system bandwidth as recited in claim 9, wherein the incrementing of the virtual time comprises incrementing a system virtual time for each cycle of a system clock.

11. A queue selection method for data transfer over a network having a system bandwidth as recited in claim 10, wherein the pre-computed amount is retrieved from a virtual time increment array.

12. A queue selection method for data transfer over a network having a system bandwidth as recited in claim 11, wherein the allocated bandwidth integer is mapped to a specific pre-computed amount in the virtual time increment array.

13. A queue selection method for data transfer over a network having a system bandwidth as recited in claim 9, wherein the incrementing of the virtual time comprises incrementing a queue virtual time of the selected one of the plurality of queues.

14. A queue selection method for data transfer over a network having a system bandwidth as recited in claim 13, wherein the incrementing of the queue virtual time is performed upon each cycle of a system clock.

15. A queue selection method for data transfer over a network having a system bandwidth as recited in claim 14, wherein the incrementing of the queue virtual time is performed for at least one cycle of the system clock while the outputting of the packet from the selected one of the plurality of queues is in progress.

16. A queue selection method for data transfer over a network having a system bandwidth as recited in claim 15, wherein the pre-computed amount is retrieved from a virtual time increment array.

17. A queue selection method for data transfer over a network having a system bandwidth as recited in claim 16, wherein the bandwidth integer of the selected one of the plurality of queues is mapped to a specific pre-computed amount in the virtual time increment array.

18. A queue selection method for data transfer as recited in claim 13, further comprising:
   comparing a packet virtual time of a packet queued in one of the plurality of queues with the queue virtual time associated with the one of the plurality of queues; and
   updating the queue virtual time to be the packet virtual time when the packet virtual time is greater than the queue virtual time.

19. A queue selection method for data transfer as recited in claim 16, wherein the packet virtual time is assigned a system virtual time when the packet is queued.

20. A queue selection apparatus for transferring data packets of any length, said apparatus comprising:
   a plurality of queues for holding data packets to be transferred over a network, each of the plurality of queues being associated with a bandwidth amount, each of the plurality of queues having a bandwidth that is less than a system bandwidth, and the sum of the bandwidth amounts for each of the plurality of queues is less than about a maximum system bandwidth integer;
   an allocated bandwidth computer for calculating an allocated bandwidth from the bandwidth amounts associated with each of the plurality of queues that are enabled, and for precomputing a set of varying time increment amounts;
   a virtual time computer for incrementing a virtual time by one of said pre-computed amounts while at least one of the plurality of queues is enabled;
   a queue selection computer for selecting one of the plurality of queues based on the virtual time; and an output port for outputting data packets of any length from the selected one of the plurality of queues, whereby said selected queue is selected in a computationally efficient manner.

21. A queue selection apparatus as recited in claim 20, wherein the virtual time computer increments a system virtual time in a system virtual time computer for each cycle of a system clock.

22. A queue selection apparatus as recited in claim 21, wherein the pre-computed amount is retrieved from a virtual time increment array.

23. A queue selection apparatus as recited in claim 22, wherein the allocated bandwidth is mapped to a specific pre-computed amount in the virtual time increment array.

24. A queue selection apparatus as recited in claim 23, wherein the virtual time computer increments a queue virtual time for the selected one of the plurality of queues in a queue virtual time computer.

25. A queue selection apparatus as recited in claim 24, wherein the queue virtual time computer increments the queue virtual time for the selected one of the plurality of queues upon each cycle of a system clock.

26. A queue selection apparatus as recited in claim 25, wherein the incrementing is performed for each cycle of the system clock while the outputting of the data is in progress.

27. A queue selection apparatus as recited in claim 26, wherein said apparatus further comprises a virtual time increment array that stores a plurality of pre-computed amounts, and wherein the pre-computed amount is retrieved from the virtual time increment array by the virtual time computer.

28. A queue selection apparatus as recited in claim 24, further comprising:
a queue virtual time adjuster for comparing a packet virtual time of a packet queued in one of the plurality of queues with the queue virtual time associated with the one of the plurality of queues, and adjusting the queue virtual time to be the packet virtual time when the packet virtual time is greater than the queue virtual time.

29. A method for selecting a queue for data transfer over a network, said method comprising:
providing a plurality of queues available for data transfer, each queue being associated with a queue virtual time and arranged to accept packets of any length;
pre-computing a set of varing time increments;
incrementing a first queue virtual time of a first queue by reference to a first one of said pre-computed time increments;
selecting one of said queues for data transfer based upon a comparison of the queue virtual times of said queues; and
outputting a packet of data of any length from said selected queue over a network, whereby said selected queue is selected for data transfer in a computationally efficient manner.

30. A method for selecting a queue as recited in claim 29 further comprising:
scaling a system bandwidth into a plurality of scaled bandwidth integers arranged to index an array;
storing said set of pre-computed time increments in said array;
determining a bandwidth integer for said first queue; and
referencing said first pre-computed time increment in said array using said determined bandwidth integer, whereby said first queue virtual time is incremented in a fair and computationally efficient manner.

31. A method for selecting a queue as recited in claim 29 further comprising:
determining an allocated bandwidth for said plurality of queues;
referencing a second pre-computed time increment in said array using said determined allocated bandwidth;
incrementing a system virtual time using said second pre-computed time increment without performing a multiplication or division operation; and
wherein said selecting one of said queues for data transfer is affected by said system virtual time.

32. A queue selection apparatus comprising:
a plurality of queues available for data transfer, each queue being associated with a queue virtual time and arranged to accept packets of any length;
a computer for precomputing a set of varying time increments;
a queue virtual time computer that increments a first queue virtual time of a first queue by reference to one of a plurality of pre-computed time increments;
a queue selection computer that selects one of said queues for data transfer based upon a comparison of the queue virtual times of said queues; and
an output port that outputs a packet of data of any length from said selected queue over a network, whereby said selected queue is selected for data transfer in a computationally efficient manner.

33. A queue selection apparatus as recited in claim 32 further comprising:
an array that stores said set of pre-computed time increments, said array being indexed by scaling a system bandwidth into a plurality of scaled bandwidth integers, wherein said queue virtual time computer references said one of a plurality of pre-computed time increments in said array using a determined bandwidth integer associated with said first queue, whereby said first queue virtual time is incremented in a fair and computationally efficient manner.

34. A queue selection apparatus as recited in claim 32 further comprising:
a system virtual time computer that references a second one of said plurality of pre-computed time increments in said array using an allocated bandwidth integer and increments said system virtual time using said second pre-computed time increment without performing a multiplication or division operation.

35. A queue selection apparatus comprising:
a plurality of queues for holding data to be transferred over a network, each of said queues being associated with a bandwidth amount and each having a bandwidth that is less than a system bandwidth, and wherein the sum of the bandwidth amounts for each of said queues is less than about a maximum system bandwidth integer;
a virtual time increment array that stores a plurality of pre-computed amounts;
an allocated bandwidth computer for calculating an allocated bandwidth from the bandwidth amounts associated with each of said queues that are enabled, said allocated bandwidth being mapped to a specific pre-computed amount in said virtual time increment array;
a system virtual time computer that increments a system virtual time for each cycle of a system clock;

a queue virtual time computer that increments a queue virtual time by a pre-computed amount for each cycle of a system clock for one of said queues while at least one of said queues is enabled, said pre-computed amount being retrieved from said virtual time increment array by said queue virtual time computer, said incrementing being performed for each cycle of said system clock while outputting data is in progress;

a queue selection computer for selecting one of said queues based on said queue virtual time;

an output port for outputting data from said selected queue; and wherein said plurality of pre-computed amounts stored in said virtual time increment array are determined in accordance with the following equation:

$$C*(100/(u*i)), \text{ where } i \in [1 \ldots 100/u]$$

wherein C is a constant, i and u are integers, and where i is an integer representing an index to said virtual time increment array and u is a unit of bandwidth allocation that is a percentage of said system bandwidth.

36. A queue selection apparatus as recited in claim 35, wherein the bandwidth of the selected one of the plurality of queues is mapped to a specific pre-computed amount in the virtual time increment array.

* * * * *